US011252942B2

(12) United States Patent
van Lenthe et al.

(10) Patent No.: US 11,252,942 B2
(45) Date of Patent: Feb. 22, 2022

(54) METHOD AND SYSTEM FOR DETERMINING A CONDITION OF AT LEAST ONE PIG IN A PEN

(71) Applicant: N.V. Nederlandsche Apparatenfabriek NEDAP, Groenlo (NL)

(72) Inventors: Luchi Willem van Lenthe, Heino (NL); Johan Marinus Gotink, Vorden (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 446 days.

(21) Appl. No.: 16/163,630

(22) Filed: Oct. 18, 2018

(65) Prior Publication Data
US 2019/0124892 A1 May 2, 2019

(30) Foreign Application Priority Data

Oct. 19, 2017 (NL) ...................................... 2019762

(51) Int. Cl.
*A01K 29/00* (2006.01)
*A01K 5/02* (2006.01)
*A01K 1/02* (2006.01)

(52) U.S. Cl.
CPC .............. *A01K 29/005* (2013.01); *A01K 1/02* (2013.01); *A01K 1/0209* (2013.01); *A01K 5/02* (2013.01); *A01K 5/0233* (2013.01); *A01K 29/00* (2013.01)

(58) Field of Classification Search
CPC ... A01K 29/005; A01K 1/0209; A01K 5/0233
See application file for complete search history.

(56) References Cited

FOREIGN PATENT DOCUMENTS

| CN | 105594611 A | 5/2016 | |
| DE | 10 2013 210 938 A1 | 12/2013 | |
| DE | 102013210938 A1 * | 12/2013 | ........... A01K 29/005 |
| EP | 1 543 721 A1 | 6/2005 | |
| EP | 1543721 A1 * | 6/2005 | ........... A01K 29/005 |
| EP | 2 798 948 A1 | 11/2014 | |
| JP | 2010207130 | 9/2010 | |
| JP | 2012-205555 A | 10/2012 | |
| WO | 2017/049301 A2 | 3/2017 | |

OTHER PUBLICATIONS

Translation of DE102013210938A1 (Year: 2013).*
Translation of EP1543721A1 (Year: 2005).*
Dutch Search Report, dated Jun. 29, 2018 (12 pages).
European Office Action.

* cited by examiner

*Primary Examiner* — Christopher D Hutchens
*Assistant Examiner* — Steven J Shur
(74) *Attorney, Agent, or Firm* — Jacobson Holman, PLLC

(57) ABSTRACT

Method and system for determining a condition of at least one pig in a pen provided with a feed unit. The pen is provided with a sensor system. For carrying out the method, a step a., step b. or a combination of steps a. and b. is possible. In step a., with the aid of the sensor system a reaction of the at least one pig is measured. This is done when with the feed unit feed is made available in the pen to the at least one pig to determine on the basis of the measured reaction a condition of the at least one pig. In step b., with the aid of the sensor system it is measured that the at least one pig 'demands' feed to determine a condition of the at least one pig.

26 Claims, 6 Drawing Sheets

METHOD AND SYSTEM FOR DETERMINING A CONDITION OF AT LEAST ONE PIG IN A PEN

BACKGROUND OF THE INVENTION

The invention relates to a method and a system for determining a condition of at least one pig in a sty. A 'condition' is understood to mean the physical condition of a pig, such as a general or more specific state of health.

Information about the physical condition of a pig is very important, in particular when the pig is in a period of time where medical problems or complications are to be expected. For a sow, one of such periods is the period of being in-pig and during farrowing. Typically, sows are moved to farrowing pens in this period. It happens that the health of a sow deteriorates unnoticed. Failure to notice health deterioration in a timely manner can have adverse consequences for the milk production and hence the development of the piglets and can also be hazardous to the pig itself.

A problem is that currently the physical condition of a pig is assessed by the stock farmer or staff. A veterinarian may be called in when the stock farmer has already observed phenomena in the pig that suggest a diminished health. The stock farmer therefore needs to be continuously alert to phenomena of reduced health in his typically numerous pigs. Timely observation of a pig's diminished health is essential to ensuring its well-being and productivity.

In line with these circumstances there is a need to support the stock farmer in his monitoring of the state of health of his pigs. Further, there is a need to be able to observe a condition or a change in the condition of a pig in a timely manner, also in the physical absence of the stock farmer.

SUMMARY OF THE INVENTION

It is an object of the present invention to provide a method and a system for determining a condition of a pig at a location of temporary sojourn. It is hence an object of the invention to obviate at least one of the existing disadvantages of the current method or to reduce the consequences thereof. It is also a possible object of the present invention to provide improved or alternative solutions which are simpler to carry out and which, moreover, can be realized at proportionally low cost.

To this end, the invention provides a method for determining a condition of at least one pig in a pen provided with a feed unit. The pen is provided with a sensor system. In a step a., with the aid of the sensor system a reaction of the at least one pig is measured. This is done when with the feed unit feed is made available in the pen to the at least one pig to determine on the basis of the measured reaction a condition of the at least one pig. In an alternative and/or supplementary step b., with the aid of the sensor system it is detected when the at least one pig 'demands' feed to determine a condition of the at least one pig. In addition to the combination of steps a. and b., it is also possible to achieve the effect of the invention by carrying out merely step a. or step b. A pen can here be understood to mean a standing and/or dwelling place bounded for a pig. This method has as an advantage that observation of the reactions of the at least one pig can be automated by means of the sensor system. For the stock farmer it will be simpler, on the basis of the measured information, to determine the condition of a pig, precisely also when the condition is different from normal.

Optionally, in step a., with the feed unit feed is made available at a time which is independent of the behavior of the at least one pig to determine on the basis of the measured reaction a condition of the at least one pig. An advantage is that in this way a reaction can be measured on the basis of supply, the offer, of food separately from the demand for food. From this it can be derived whether the pig expectably reacts to an offer of feed. When the pig does not do so, for example when the pig does not react, or reacts with a delay, the stock farmer could infer from this that the pig's physical condition is poor/not good or deviant from normal.

Optionally, in step b., with the sensor system a reaction of the at least one pig is measured when with the feed unit feed is made available in the pen to the at least one pig to determine on the basis of the measured reaction a condition of the at least one pig. An advantage is that in this way a reaction can be measured on the basis of demand for food separately from the supply, the offer, of food. From this, it can be derived whether the pig exhibits an expected demand for food (and optionally acceptance of food). When the pig does not do so, for example when the pig fails to demand feed, the stock farmer could infer from this that the pig's physical condition is poor/not good or deviant from normal.

Optionally, a combination with the preceding option would give the stock farmer an insight into how the at least one pig deals with both the demand for food and the supply of food, while these variables can be looked at without their mutually interfering. Also, this makes it possible for the stock farmer to infer on the basis of the measured behaviors of the at least one pig whether the pig exhibits a shifted supply-demand balance relative to a healthy pig. Also, a diminished health can be accurately derived from this.

Optionally, the condition that is determined of the at least one pig comprises healthy or unhealthy. This is to say that not only a diminished health is determined, but it is also determined whether the behaviors of the pig fall within a range of healthy behavior, so that health or unhealthiness can be derived from this.

Optionally, signals generated with the aid of the sensor system are processed using a signal processor to determine the condition of the at least one pig. Such a signal processor could for example compare a reference value for a demand for food and/or a reaction to supply of food with a measured demand for food and/or a measured reaction to supply of food. The signal processor could apply a health analysis. In this health analysis, for example, the signal processor could determine the condition of the at least one pig to be healthy when a measured value is higher than the reference value or the reference value minus a buffer value. The reference value is then an expectation value/average value belonging to a healthy pig. The obverse would then apply for a determination of an unhealthy condition. The buffer value can then take a value between zero and a difference value. This difference value could then be a difference between a predetermined measured value for a sick pig and healthy pig. This can hold both for embodiments relating to the demand for food and for embodiments relating to the reaction to supply of food. Further, it will be clear that to come to a determination of healthy or unhealthy status, it is possible to start from a multiplicity of measurements.

Optionally, with the processor, it is determined on the basis of the sensor signals as an intermediate result whether, and if so, when, with respect to the moment at which the feed is made available, the at least one pig reacts thereto. On the basis of the intermediate result, the processor determines the condition of the at least one pig. An advantage is that the stock farmer, besides establishing reaction, can also establish whether the at least one pig has a certain slowness of reaction that is unusual for such a pig. With the intermediate result it can then be determined more accurately whether a pig is healthy or unhealthy.

Optionally, with the processor it is determined as an intermediate result whether within a predetermined period after the feed has been made available the at least one pig reacts thereto. The predetermined period of time can here be a reaction time of a healthy pig minus a further buffer value. The further buffer value can be between zero and a further difference value. The further difference value is the difference between a predetermined reaction time of a healthy pig and a predetermined reaction time of a sick pig.

Optionally, the processor determines on the basis of the intermediate result that the at least one pig is unhealthy when a reaction to the feed made available fails to occur, more specifically, when for the at least one pig the reaction fails to occur within a predetermined period after the feed has been made available. Further, it may be that the intermediate result is based on multiple measurements, with food being offered at different moments. This could then yield an average reaction time, for comparison with the predetermined period. It will be clear that this may also be the case outside this option.

Optionally, the processor determines on the basis of the intermediate result that the at least one pig is healthy when within a predetermined period after the feed has been made available the pig reacts thereto. It will be clear that the predetermined period of this option need not necessarily be the same as the predetermined period of the foregoing option. The advantage is that, in this way, there is also a range in which allowance can be made for a recovering pig, and that such pig may continue to be marked as unhealthy until the healthy status can be established with certainty.

Optionally, the processor delivers a particular condition of the at least one pig in association with an identity of the at least one pig. This can be done by means of a signal which is sent to a human interface. Further, it may also be that the processor merely delivers a particular condition of the at least one pig if there is a change with respect to the preceding condition delivered. In this way, via the human interface, it can be reported to the stock farmer when a specific healthy pig has become unhealthy and when an unhealthy pig has become healthy again. To determine the identity of a pig, the pig may be provided with an RFID tag. The sensor system could then be configured to read out the RFID tag at the feed unit with an RFID reader. Identity can also result from standing location information. For example, to the stock farmer, it is often clear which pig is in which farrowing pen. The pig may thus be identified by the respective farrowing pen. Accordingly, the signal processor can also deliver the condition in association with a farrowing pen reference or farrowing pen identification. In such an example, the use of an RFID tag and an RFID reader is not necessary.

Optionally, for determining a condition of a group of pigs in the pen, with the aid of the sensor system a reaction of the group of pigs is measured. This is done, for example, when with the feeding unit feed is made available in the pen to the group of pigs to determine a condition of the group of pigs. In an example, the reaction to offered food of the first pig to react from the group is measured, and/or the average reaction time and/or number of pigs. Also, for example, an average demand for food per pig across the whole group may be measured. The average demand may be determined, for example, by dividing the total number of demands for food by the total number of pigs. This health analysis could be performed by the signal processor. In another example, the reaction to the offered food and/or the demand is measured per pig. This could be done on the basis of RFID tag identification on or at the feed unit. When any one of the pigs in the group is then determined to be unhealthy, the group as a whole can be marked as unhealthy. This could be useful for quarantine purposes.

Optionally, the condition of the group of pigs that is determined comprises healthy or unhealthy. Further, the condition could also comprise 'recovering'.

Optionally, the signals generated with the aid of the sensor system are processed using a signal processor to determine a condition of the group of pigs. Typically, it is a complex procedure for the stock farmer to distinguish each individual pig within a group. Also, it is often difficult then to keep an eye on what the behaviors of the individual pigs are. An advantage is that, in this way, groups as a whole can be used to trace such deviations of at least a single pig. When in a group unhealthy behavior is detected, the stock farmer can search the group for the at least one pig that exhibits unhealthy behavior. In this way, tracing the pig is limited to a cluster of pigs within the same pen, and hence not the entire sty. This yields a gain of time.

Optionally, with the signal processor, on the basis of the sensor system signals, it is determined as an intermediate result whether, and if so, when, with respect to the moment at which the feed is made available, pigs of the group of pigs react thereto. On the basis of the intermediate result, the processor determines the condition of the group of pigs. An advantage is that the slowness of reaction can be determined for a group. This may already provide an insight into the average health picture of the group.

Optionally, with the signal processor, it is determined as an intermediate result whether within a predetermined period after the feed has been made available, pigs of the group of pigs react thereto.

Optionally, the signal processor determines on the basis of the intermediate result that pigs of the group of pigs are unhealthy when within a predetermined period after the feed has been made available, pigs of the group of pigs do not react thereto.

Optionally, the signal processor determines on the basis of the intermediate result that pigs of the group of pigs are healthy when within a predetermined period after the feed has been made available, pigs of the group of pigs react thereto.

Optionally, the signal processor delivers a particular condition of pigs of the group of pigs in association with an identity of the group of pigs or pigs of the group of pigs.

Optionally, the sensor system is configured to detect the presence of at least one pig at the feed unit and/or to detect that the pig eats the feed which has been made available.

Optionally, the sensor system comprises at least one sensor such as an IR sensor, a movement sensor for example for detecting a movement of a clapper, a capacitive sensor, a pressure sensor for example for measuring a loading of a pressure plate by the pig, a light sensor for example for detecting a movement of a clapper or a presence of a pig, a G sensor for example for detecting a movement of a clapper and/or a sound sensor for example for detecting a presence of a pig. The sensor may also comprise a reed contact or consist of a reed contact, for example a reed contact in combination with a magnet for detecting a movement of the magnet, the magnet for instance being attached to a sensor actuator, such as a clapper, to be energized by a pig or being formed by the sensor actuator. A clapper may here also be a valve with a switch, which provides access to food in the feed unit. It will be clear that an RFID reader may be present next to the at least one sensor, for identifying the at least one pig.

Optionally, the feed unit dispenses feed to a pig presenting itself at the feed unit in an automatic manner. An advantage is that the pig will also keep coming to the feed unit to demand feed when it does not get any feed a number of times. After all, since the pig is used to getting feed upon demand, denying the pig feed now and then will have little influence, if any at all, on the extent to which the pig's demand for food is measured. This option accordingly enables the demand for feed to be measured at particular moments without the demand having to be complied with. This saves feed and prevents the at least one pig being fed in an irregular manner.

Optionally, the pen is used as a farrowing pen and/or insemination pen. It will be clear that an adult sow staying in a farrowing pen or insemination pen may, under certain circumstances, experience stress periodically. Indeed, in periods such as gestation, farrowing, but also impregnation, the health of the pig can change rapidly. The advantage is that the stock farmer can intervene rapidly and can simply and rapidly determine diminished health without needing to be present.

Optionally, the pen is used for pork pigs. The at least one pig can then be a pork pig or weaner pig. In this way, also the health of new-born piglets can be determined from the moment that supplementary feeding starts.

Optionally, the pen is used for pork pigs, the group of pigs being pork pigs or weaner pigs.

According to a further aspect of the invention, there is also provided a system. The system itself includes a pen, a feed unit, a sensor system and a signal processor which are configured to carry out the method according to the invention.

Optionally, the signal processor is provided with a transmitter and/or receiver, such as a UHF transmitter/receiver, for transmitting and receiving a determination of a condition to a human interface.

DESCRIPTION OF THE DRAWINGS

The invention will further be clarified by the description of a few specific embodiments. For the purpose, use is made of references to the appended figures. The detailed description provides examples of possible modes of application of the invention. These application forms should not be regarded as the only possible embodiments falling within the scope of the invention. The scope of the invention is defined in the claims, and the description is to be regarded as being illustrative without thereby limiting the invention.

DETAILED DESCRIPTION OF THE INVENTION

Figure 1:
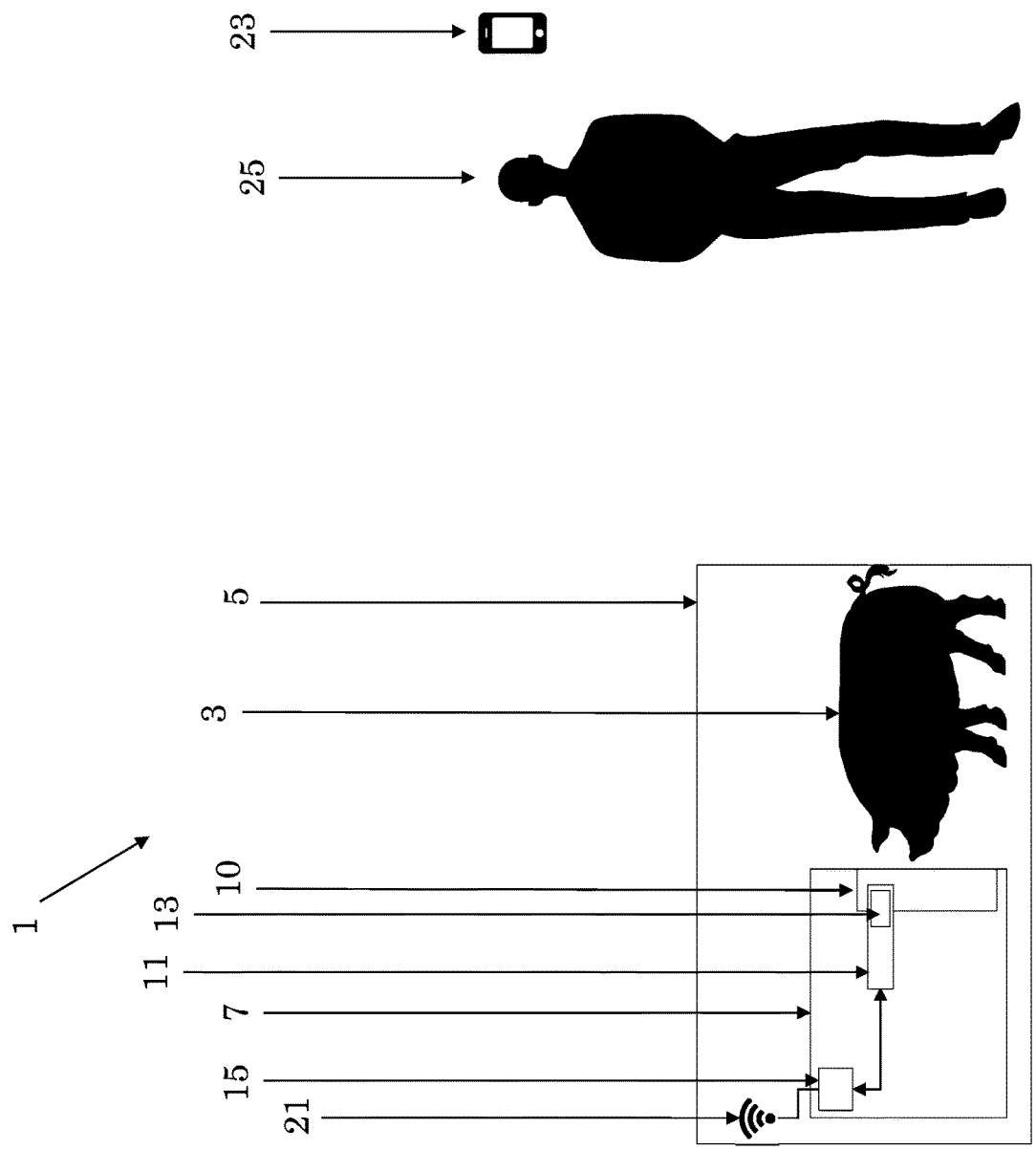
FIG. 1 shows schematically a first embodiment of a system according to the invention for determining a condition of a sow in a farrowing pen.

FIG. 1 schematically shows a system 1 for determining a physical condition, namely the health, of a pig 3 in a pen 5. The pig 3 is a sow here and the pen 5 a farrowing pen. In this example, the identity of the pig is derived from its standing location, namely the farrowing pen. The pen 5 is provided with a feed unit 7. The feed unit 7 comprises, for example, a trough and a dosing unit which is configured to supply feed to the trough. A pig can eat this feed from the trough. The feed unit 7 is implemented with a sensor actuator 10, which is a clapper in this example but may also be, for example, a push plate, which can be pushed on by a pig to send a drive signal to a dosing unit (not represented, but conventional) which doses food to the feed unit 7. Connected to the feed unit 7 is a sensor system 11. The sensor system 11 has a sensor 13, such as a switch or pressure sensor, which is configured to cooperate with the sensor actuator 10. The sensor 13 detects when a pig 3 energizes the sensor actuator 10 by pushing it on or moving it otherwise. The sensor 13 can also comprise a reed contact or consist of a reed contact, for example a reed contact in combination with a magnet for detecting a movement of the magnet, the magnet being attached to the sensor actuator 10 or being formed by the sensor actuator 10. In the system according to FIG. 1 the pen 5 has such dimensions that it is suitable for holding a single adult pig in the pen 5. Further, it is noted already at this point that with the system according to FIG. 1 it is not necessary to identify the pig energizing the sensor actuator 10. In the pen in which only a single pig is accommodated, the identity, if it is desired, can be established beforehand. It will be clear that the identity of the pig 3 is also deducible from the pen 5 when the pig 3 is the only adult pig in the pen 5 as in the system according to FIG. 1. The identity of the pig 3 can then be derived from the pen 5 (the identity of the pen determines on the basis of prior knowledge the identity of the pig that is in that pen). When the pig 3 energizes the sensor actuator 10 a first signal is delivered by the sensor 13 to the sensor system 11. The sensor system 11 is communicatively connected with a signal processor 15 for communicating the first signal to it. The signal processor 15 is a preprogrammed computer unit which is configured to interpret the first signal as a demand for food. The signal processor 15 is further configured to monitor whether the pig 3 demands feed within a predetermined period in a day, such as a morning, afternoon, or evening period; this can also be done outside this example. If the pig 3 does not demand food within this predetermined period, the signal processor will determine that the pig 3 is unhealthy (or not healthy or possibly not healthy). This can also be done outside this example. When the pig 3 itself demands food, this pig is determined as being healthy by the signal processor 15. The signal processor 15 is further also configured to actuate the dosing unit at predetermined moments for dosing feed when the pig 3 does not demand feed. This is a so-called bait portion. The signal processor 15 is provided with a clock (not represented, but conventional). The signal processor 15 then measures how much time elapses until the pig 3 reacts to the bait portion. When the pig does not react within a reaction period of a defined adjustable time duration, as within an hour, the signal processor 15 determines on the basis of this intermediate result that the pig 3 is unhealthy. The intermediate result remains in force until the pig 3 itself demands food by collecting the bait portion. The signal processor 15 is communicatively connected with a communication device 21. The signal processor 15 compares the current physical condition of the pig 3 with the most recent preceding physical condition of the pig 3. The signal processor 15 is configured for, upon change of the physical condition, generating a second signal which contains information about the identity of the pig 3 and the current health status and whether the determination is on the basis of an intermediate result. Information about the identity of the pig 3 can then be, for example, a pen number or information for determining the pen 5. When the pen 5 is the only pen 5 on the farm, the second signal implicitly already contains information about the identity of the pig 3. This is also the case when the pig 3 is the only pig on the farm. The communication device in this example comprises a UHF transmitter/receiver for sending the second signal, for example via a network for mobile telephony (not represented, but conventional), to a human interface 23 and for communicating via the same route with the human interface 23. The human interface 23 in this example is a smartphone of a stock farmer 25. Optionally, via the human interface 23 the stock farmer 25 can also link an identity of a pig 3 to a pen number or the signal processor 15 of the pen 5. Optionally, this can be done by providing the identity of the pig 3 to the signal processor 15, for example via the communication device 21. Via the human interface 23 the stock farmer 25 is able to monitor any changes in the health condition of the pig 3. Providing feed when the animal demands it may also be omitted. In that case, the system itself determines when feed is made available and it is detected whether, and if so, when the pig 3 reacts thereto as described above with reference to the bait portion. In fact, this also involves bait portions, which, however, also provide for the total amount of feed given to the animal.

Figure 2:
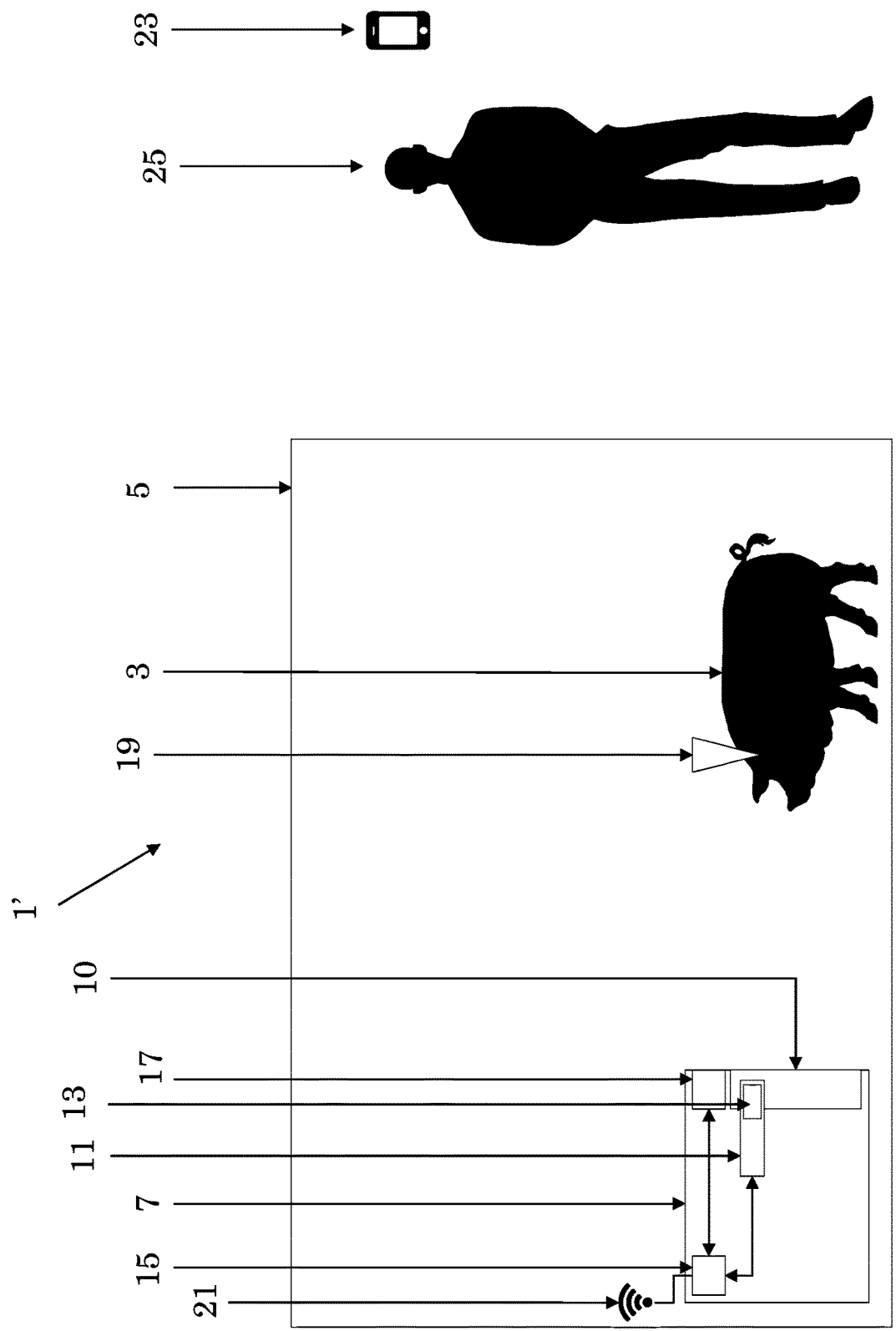
FIG. 2 shows schematically a second embodiment of a system according to the invention for determining a condition of a pig in a pen.
Figure 3:
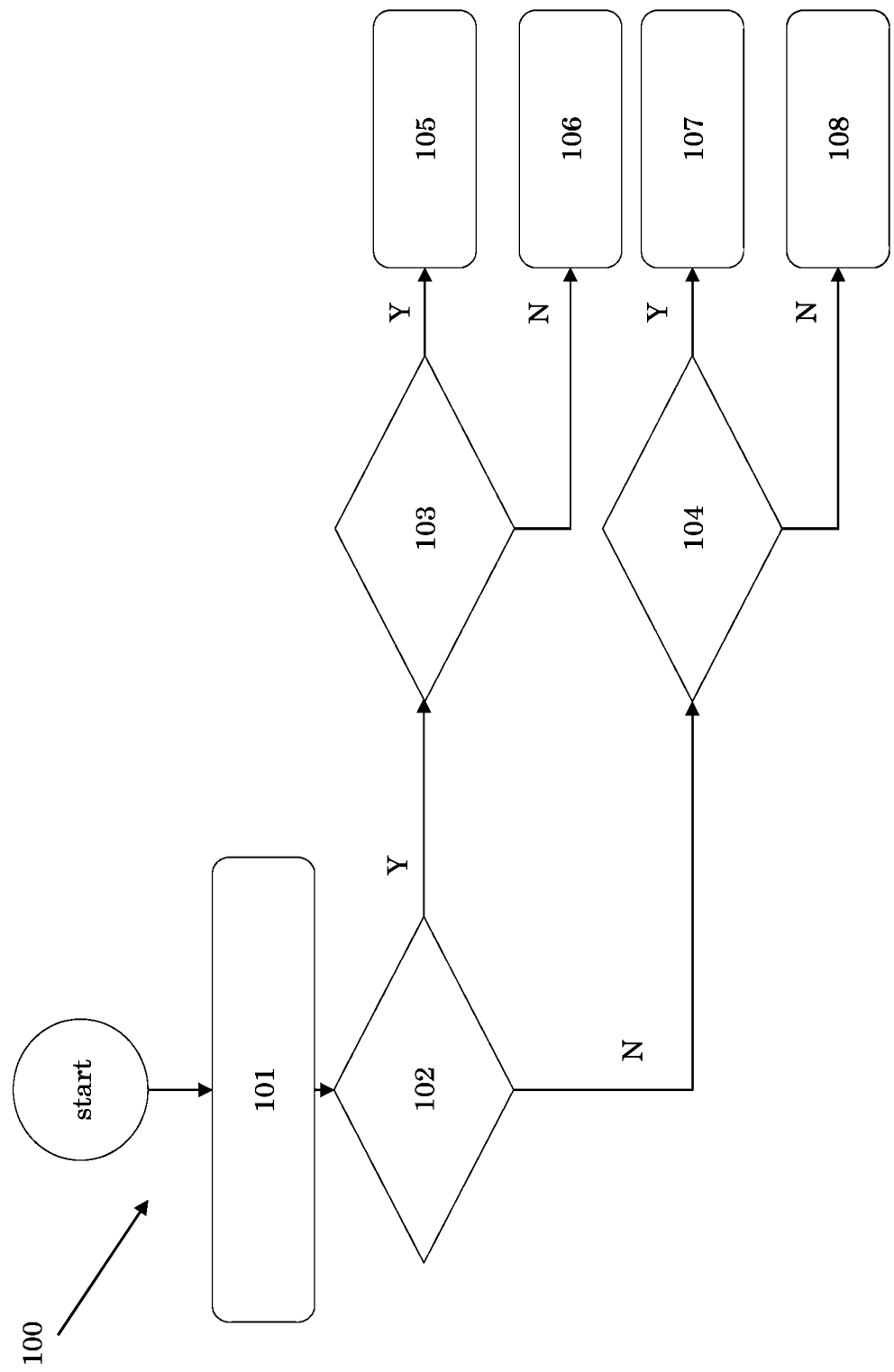
FIG. 3 shows a first schematic method for determining a condition of at least one pig in a pen of the system according to FIG. 1 and the system according to FIG. 2.

FIG. 3 shows a first schematic method 100 for determining the physical condition, namely the health, of the pig 3 in the pen 5 in the system according to FIG. 1. This method, however, is also applicable to the system 1' of FIG. 2 as will be discussed hereinafter.

In a first step 101, the pig 3 is introduced into the pen 5. The first step 101 leads to a second step 102.

In the second step 102, it is measured by the sensor system 11 whether the pig 3 demands food at the feed unit 7 within a predetermined portion of a day, of four hours in this example. Also outside of this example, it may be that the nocturnal sleeping period of the pig 3, or the sow, is not taken into account in the determination, because the pig is not expected to be active during sleep. If the pig 3 demands food within the predetermined portion of a day, the second step 102 leads to a third step 103. If the pig 3 does not demand food, the second step 102 leads to a fourth step 104. The second step 102 and subsequent steps are repeated every defined portion of a day.

In the third step 103, it is determined by the signal processor 15 that the pig 3 is healthy. The signal processor 15 then compares whether there is any change in the physical condition. When there is no preceding determination of physical condition, the determination in this step is also regarded as a change in the physical condition. If there is a change, the third step 103 leads to a fifth step 105. If there is no change, the third step 103 leads to a sixth step 106.

In the fourth step 104, it is determined by the signal processor 15 that the pig is unhealthy. The signal processor 15 then compares whether there is any change in the physical condition. When there is no preceding determination of physical condition, the determination is here also regarded as a change. If there is any change, the fourth step 104 leads to a seventh step 107. If there is no change, the fourth step leads to an eighth step 108.

In the fifth step 105, the communication device 21 sends a message to the human interface 23 of the stock farmer with the identity information of the pig 3 together with the physical condition, being 'healthy'. This can be done in the form of an SMS message, MMS message, and/or e-mail. The identity information of the pig 3 can, also in this method, be the pen number or information from which the identity of the pig can be derived. This identity information can hence also be implicit and there is further, besides notification of health condition, no additional information needed when the identity is clear to the stock farmer 25, for example when there is just a single pen.

In the sixth step 106, the stock farmer is not informed. The stock farmer will then infer that the pig is healthy and has remained healthy. In effect, therefore, the sixth step is here: no action. This prevents the stock farmer 25 getting a message for each pig when no health problems have been determined.

In the seventh step 107, the communication device 21 sends a message to the human interface 23 of the stock farmer with the identity information of the pig 3 together with the physical condition 'unhealthy'. This can take the form of an SMS message, MMS message, and/or e-mail.

In the eighth step 108, the communication device 21 sends a message to the human interface 23 of the stock farmer with the identity information of the pig 3 together with the physical condition which is still unhealthy. This can take the form of an SMS message, MMS message, and/or e-mail.

The fifth, sixth, seventh and eighth steps 105, 106, 107, 108 all lead to the second step 102 for a new determination about a consecutive next portion of a day. Optionally, the physical condition of the pig 3 together with the identity information of the pig 3 can be updated in an up-to-date overview to which the stock farmer 25 has access via the human interface 23. Optionally, the human interface 23 is configured to generate such an up-to-date overview, as based on the messages sent to the human interface 23.

Figure 4:
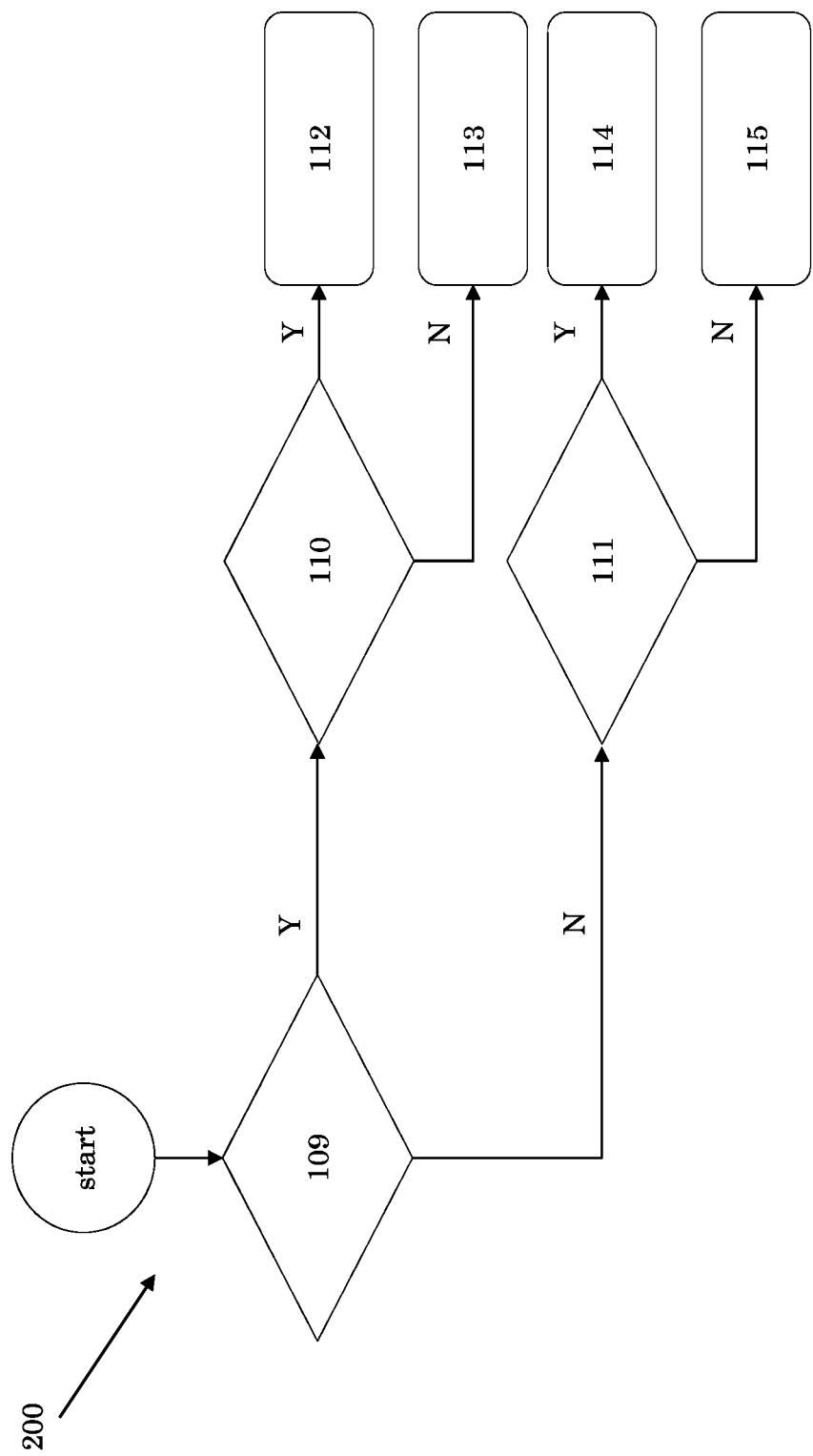
FIG. 4 shows a second schematic method for determining a condition of at least one pig in a pen of the system according to FIG. 1 and the system according to FIG. 2.

FIG. 4 shows a second schematic method 200 for determining the physical condition, namely the health, of the pig 3 in the pen 5 in the system according to FIG. 1. This method, however, is also applicable to the system of FIG. 2 as will be discussed hereinafter. The second method 200 may also run parallel to the first method 100, but, as already indicated, not necessarily so. In a ninth step 109, the signal processor 15 actuates the dosing unit to dispense the bait portion for the pig 3 in the pen 5. The signal processor 15 then determines whether the pig 3 reacts to the dosed feed within the reaction period, which is shorter than the part of the day, in this example within an hour. Reacting here means measuring of the demand for food by the pig 3 in reaction to the bait portion and/or the eating of the portion which, as such, can also be detected with known means. It will be clear that in this case the pig 3 does not truly demand food, since the food is already present in the feed unit 7. If it is measured that the pig 3 demands feed within the reaction period, the ninth step 109 leads to a tenth step 110. If not, the ninth step 109 leads to an eleventh step 111.

In the tenth step 110, it is determined by the signal processor 15 that the pig is healthy. The signal processor 15 then compares whether there is any change in the physical condition. When there is no preceding determination of physical condition, the determination is here also regarded as a change. If there is a change, the tenth step 110 leads to a twelfth step 112. If there is no change, the tenth step 110 leads to a thirteenth step 113.

In the eleventh step 111, it is determined by the signal processor 15 that the pig is unhealthy. The signal processor 15 then compares whether there is any change in the physical condition. When there is no preceding determination of physical condition, the determination is here also regarded as a change. If there is any change, the eleventh step 111 leads to a fourteenth step 114. If there is no change, the eleventh step 111 leads to a fifteenth step 115.

In the twelfth step 112, the communication device 21 sends a message to the human interface 23 of the stock farmer with the identity information of the pig 3 together with the physical condition healthy. This can take the form of an SMS message, MMS message, and/or e-mail. In this method also, the identity information of the pig 3 can be the pen number or information from which the identity of the pig can be derived. This identity information can hence also be implicit and there is further, besides notification of a health condition, no additional information necessary when the identity is clear to the stock farmer 25, for example when there is just a single pen.

In the thirteenth step 113, the stock farmer is not informed. The stock farmer will then infer that the pig is healthy and has remained healthy. In effect, therefore, the thirteenth step is here: no action. This prevents the stock farmer 25 getting a message for every pig when no health problems have been determined.

In the fourteenth step 114, the communication device 21 sends in a message to the human interface 23 of the stock farmer the identity information of the pig 3 together with the physical condition unhealthy. This can take the form of an SMS message, MMS message, and/or e-mail.

In the fifteenth step 115, the communication device 21 sends in a message to the human interface 23 of the stock farmer the identity information of the pig 3 together with the physical condition still unhealthy. This can take the form of an SMS message, MMS message, and/or e-mail.

When the second method 200 is used in combination parallel to the first method 100, each message to the human interface resulting from the twelfth, fourteenth and fifteenth steps 112, 114, 115 will also contain information that the respective message is based on an intermediate result. The twelfth, thirteenth, fourteenth and fifteenth steps 112, 113, 114, 115 all lead to the ninth step 109 after a predetermined wait period of two hours, and do not take place within the nocturnal periods in which the pig 3 is expected to sleep.

Optionally, preferably using a signal processor 15, it is determined that the at least one pig is on the point of delivery when it is detected with the aid of the sensor system 11 that the at least one pig 'demands' feed repeatedly at intervals of 0-15 minutes or continuously over a period of a few hours, preferably 2-8 hours, more preferably 5-7 hours. Being on the point of delivery (farrowing) is a condition involving a hazard to the pig's health.

Figure 5A:
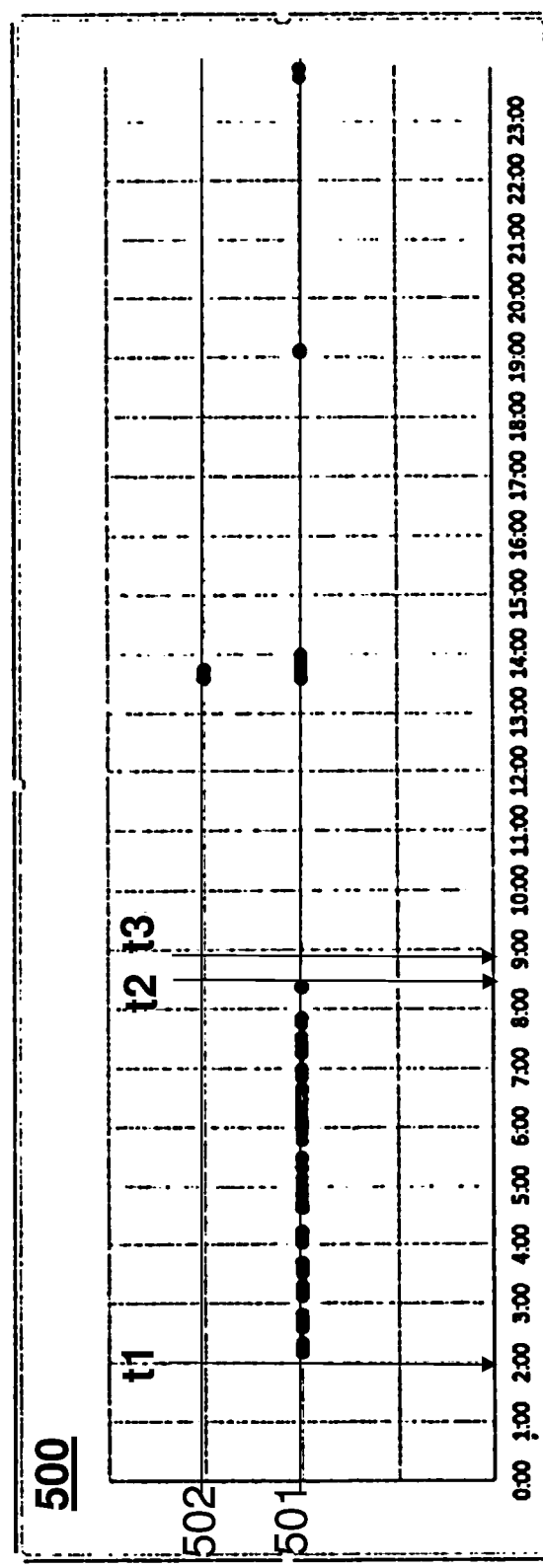
FIG. 5A shows a first diagram with experimental data points of feeding behavior of a pig.

FIG. 5A shows a first diagram 500 with experimental data points. In the first diagram 500, the feeding behavior of the pig 3 is represented in time. The pig 3 in this example is in-pig and is in the pen 5 of the system 1 according to FIG. 1. The first diagram 500 covers a complete day from midnight. Time is plotted along the horizontal axis. A dot on line 501 represents a moment in time at which the pig 3 energizes the sensor actuator 10. A dot on line 502 represents a moment in time at which the feed unit 7 makes a portion of feed available to the pig 3. The pig 3 exhibits restless behavior and energizes the sensor actuator 10 repeatedly at intervals of 0-15 minutes over a period of a few hours, in this example six hours. With the aid of the sensor system 11, using a signal processor 15, this behavior can be detected and it can be determined (concluded) that the animal is going to deliver. This restless behavior can optionally also be regarded as deviant, or also unhealthy. The communication device 21 can optionally send to the human interface 23 a message with the identity information of the pig 3 together with the physical condition and/or a warning that the pig 3 is on the point of beginning to farrow. At time t1, 2:00, the pig starts demanding feed and at time t2, 8:00, the pig stops demanding feed. At time t3, 9:00, the pig 3 started farrowing down.

Figure 5B:
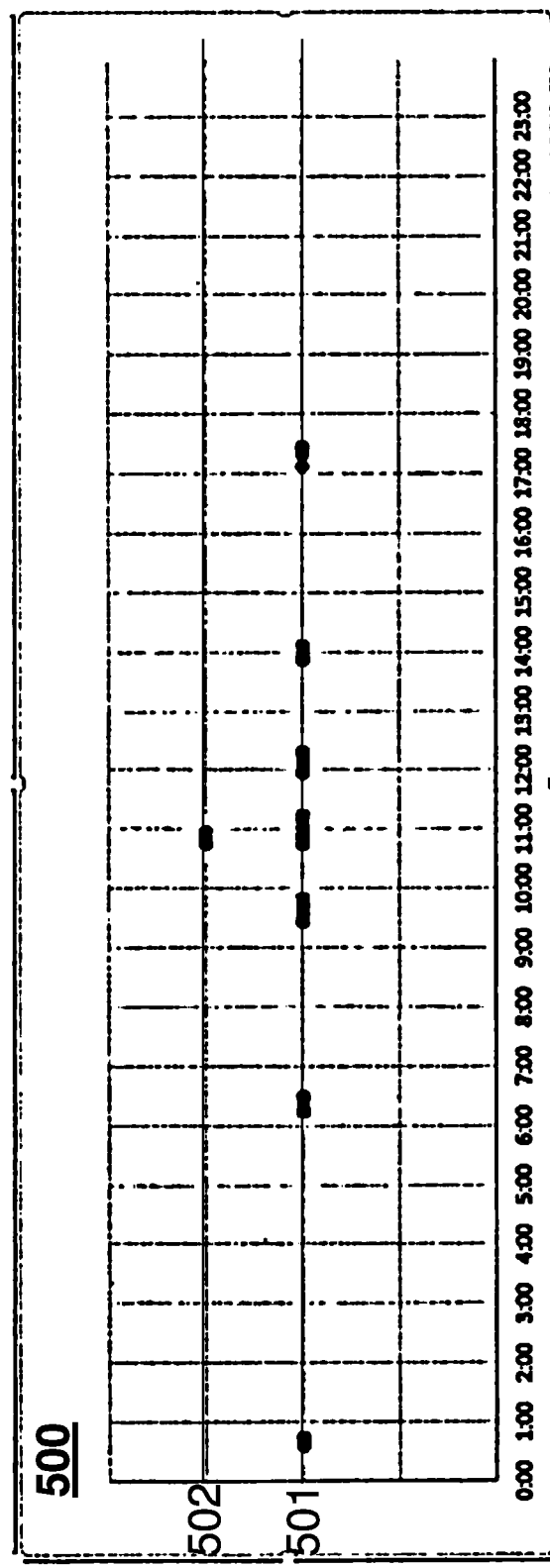
FIG. 5B shows a second diagram with experimental data points of feeding behavior of a pig.

FIG. 5B shows a second diagram 600 with experimental data points. In the second diagram 600 the feeding behavior of the pig 3 a few days after farrowing down is represented in time. FIG. 5B is an example of normal feeding behavior in a pig. The second diagram 600 covers a complete day from midnight. Here too, time is plotted along the horizontal axis. A dot on line 601 represents a moment in time at which the pig 3 energizes the sensor actuator 10. A dot on line 602 represents a moment in time at which the feed unit 7 makes feed available to the pig 3. The pig 3 energizes the sensor actuator 10 at intervals of one to three hours during the non-nocturnal period between time points 6:00 and 18:00. Outside these time points, energization of the sensor actuator 10 is sporadic, not more than twice. Also, the pig 3 energizes the sensor actuator 10 within a few minutes after feed is made available. FIG. 5B shows normal feeding behavior of a pig. When the pig 3 deviates from this behavior, this can be seen as deviant or unhealthy behavior or an indication that the animal is going to deliver.

FIG. 2 shows schematically a second embodiment of a system 1' according to the invention. In FIGS. 1 and 2, mutually corresponding parts are provided with the same reference numeral. Hereinafter, only the differences of the system 1' with respect to the system 1 will be discussed. Unlike in FIG. 1, the pen 5 in FIG. 2 has such dimensions that it is suitable for holding multiple adult pigs in the pen 5. Here, the pen 5 is not necessarily a farrowing pen and the multiple pigs are not necessarily sows. Here, the feed unit 7 is further provided with an RFID reader 17 for reading an RFID tag 19 which is connected to an ear of the pig 3. The RFID tag 19 contains information about the identity of the pig 3. The RFID reader 17 is configured to read out the RFID tag 19 when the pig 3 energizes the sensor actuator 10. The RFID reader 17 then communicates the identity information of the pig to the signal processor 15. The signal processor 15 here receives the first signal and the identity information at the same time and associates them with each other for the second signal. In this way, among a multiplicity of pigs in the pen 5, it can be distinguished which pig of a multiplicity of pigs in the pen 5 demands feed and/or reacts to a bait portion. In this way, also among a multiplicity of pigs in a multiplicity of pens, it can be distinguished which pig demands feed and/or reacts to a bait portion without a stock farmer determining the identity of the pigs beforehand. Thus, the pen 5 may also be a pen which has such dimensions that it is suitable for holding a single adult pig in the pen 5. The RFID reader 17 can also, apart from this example, be part of the sensor system 11. The system 1' further works as described above for the system 1.

For the sake of clarity and conciseness of the description, features have been described here as part of the same or of separate embodiments. It will be clear to those skilled in the art that embodiments comprising combinations of any or all of the described features also fall within the scope of protection of the invention. Within the purview of the skilled person, modifications are possible that are understood to be within the scope of the protection. Further, all kinematic inversions are understood to be within the scope of protection of the present invention. Expressions such as "consisting of", when used in this description or the appended claims, should be construed not as an exhaustive enumeration but rather in an inclusive sense of "at least consisting of". Designations such as "a" or "one" may not be construed as a limitation to just a single specimen, but have the meaning of "at least a single specimen" and do not exclude a plurality. Expressions such as: "means for . . . " should be read as: "component configured for . . . " or "element constructed to . . . " and should be construed to encompass all equivalents for the structures disclosed. The use of expressions like: "critical" "advantageous", "preferably", "desired", etc. is not intended to limit the invention. Moreover, features that are not specifically or expressly described or claimed in the construction according to the invention but which are within the reach of the skilled person may also be encompassed without departing from the scope of protection as defined by the claims.

The invention claimed is:

1. A method for determining a condition of at least one pig in a pen provided with a feed unit, wherein the pen is provided with a sensor system which is operable by the at least one pig to operate the feed unit, wherein the method comprises:
   in a step a supplying, with the feed unit, feed to the at least one pig by making the feed available in the pen, determining using the sensor system, a reaction of the at least one pig to supply of feed, and to determine on the basis of the measured reaction a condition of the at least one pig or
   in a step b detecting, using the sensor system, that the at least one pig demands feed, wherein the demand for feed is detected if a signal is delivered by the sensor system independent of a supply of feed by the feed unit and determine a condition of the at least one pig based on the determination of the demand for feed.

2. The method according to claim 1, wherein
   in step a with the feed unit feed is made available at a time which is independent of the behavior of the pig or
   in step b with the sensor system a reaction of the at least one pig is measured when the feed unit feed is made available in the pen to the at least one pig to determine on the basis of the measured reaction a condition of the at least one pig.

3. The method according to claim 1, wherein the condition of the at least one pig that is determined comprises healthy or unhealthy.

4. The method according to claim 1, wherein signals generated with the aid of the sensor system are processed using a signal processor to determine the condition of the at least one pig.

5. The method according to claim 4, wherein the signal processor on the basis of the signals by the sensor system it is determined as an intermediate result whether, and if so, when with respect to the moment at which the feed is made available the at least one pig reacts thereto,
   wherein the signal processor on the basis of the intermediate result determines the condition of the at least one pig.

6. The method according to claim 4, wherein with the signal processor it is determined as an intermediate result whether within a predetermined period after the feed has been made available the at least one pig reacts thereto.

7. The method according to claim 5, wherein the signal processor on the basis of the intermediate result determines that the at least one pig is unhealthy when within a predetermined period after the feed has been made available the at least one pig does not react thereto.

8. The method according to claim 5, wherein the signal processor on the basis of the intermediate result determines that the at least one pig is healthy when within a predetermined period after the feed has been made available the at least one pig reacts thereto.

9. The method according to claim 4, wherein the signal processor delivers a particular condition of the at least one pig in association with an identity of the at least one pig.

10. The method according to claim 1, wherein for determining a condition of a group of pigs in the pen with the aid of the sensor system a reaction of the group of pigs is measured when the feed unit feed is made available in the pen to the group of pigs to determine a condition of the group of pigs.

11. The method according to claim 10, wherein the condition of the group of pigs that is determined comprises healthy or unhealthy.

12. The method according to claim 10, wherein the signals generated with the aid of the sensor system are processed using a signal processor to determine a condition of the group of pigs.

13. The method according to claim 12, wherein the signal processor on the basis of the sensor system signals it is determined as an intermediate result whether, and if so, when with respect to the moment at which the feed is made available pigs of the group of pigs react thereto, wherein the signal processor on the basis of the intermediate result determines the condition of the group of pigs.

14. The method according to claim 1, wherein with the signal processor it is determined as an intermediate result whether within a predetermined period after the feed has been made available pigs of a group of pigs react thereto.

15. The method according to claim 13, wherein the signal processor on the basis of the intermediate result determines that pigs of the group of pigs are unhealthy when within a predetermined period after the feed has been made available pigs of the group of pigs do not react thereto.

16. The method according to claim 13, wherein the signal processor on the basis of the intermediate result determines that pigs of the group of pigs are healthy when within a predetermined period after the feed has been made available pigs of the group of pigs react thereto.

17. The method according to claim 12, wherein the signal processor delivers a particular condition of pigs of the group of pigs in association with an identity of the group of pigs or pigs of the group of pigs.

18. The method according to claim 1, wherein the sensor system is configured to detect the presence of at least one pig at the feed unit or to detect that the at least one pig eats the feed that has been made available.

19. The method according to claim 1, wherein the sensor system comprises at least one sensor from a set of the following sensors: an IR sensor, a movement sensor for detecting a movement of a clapper, a capacitive sensor, a pressure sensor, a light sensor, for detecting a movement of a clapper, a G sensor, for detecting a movement of a clapper, a sound sensor, a reed contact, a reed contact in combination with a magnet for detecting a movement of the magnet, where the magnet is attached to the clapper or is formed by the clapper.

20. The method according to claim 1, wherein the feed unit delivers feed in an automatic manner to a pig presenting itself at the feed unit.

21. The method according to claim 1, wherein the pen is used as a farrowing pen or a insemination pen.

22. The method according to claim 1, wherein the pen is used for pork pigs, the at least one pig being a pork pig or weaner pig.

23. The method according to claim 10, wherein the pen is used for pork pigs, the group of pigs being pork pigs or weaner pigs.

24. The method according to claim 1, wherein in step b, using a signal processor, it is determined that the at least one pig is on the point of delivering when with the aid of the sensor system it is detected that the at least one pig over a period of a few hours, demands feed repeatedly at intervals or continuously.

25. The method according to claim 1, wherein the determined condition of the at least one pig is compared with a preceding condition of the at least one pig, and wherein, upon change in the comparison of the two conditions, a signal is generated which contains information about the identity of the at least one pig and the determined condition, wherein the signal is transmitted to a user.

26. A system comprising a pen, a feed unit, a sensor system and a signal processor which are configured to carry out a method according to claim 1.

* * * * *